(12) United States Patent
Woodcock, IV

(10) Patent No.: US 10,440,147 B2
(45) Date of Patent: Oct. 8, 2019

(54) QUALITY-OF-SERVICE MANAGEMENT FOR DOMAIN NAME SERVICE

(71) Applicant: William Edward Woodcock, IV, Berkeley, CA (US)

(72) Inventor: William Edward Woodcock, IV, Berkeley, CA (US)

( * ) Notice: Subject to any disclaimer, the term of this patent is extended or adjusted under 35 U.S.C. 154(b) by 96 days.

(21) Appl. No.: 15/361,367

(22) Filed: Nov. 25, 2016

(65) Prior Publication Data

US 2017/0149930 A1     May 25, 2017

Related U.S. Application Data

(60) Provisional application No. 62/259,489, filed on Nov. 24, 2015.

(51) Int. Cl.
| | | |
|---|---|---|
| *H04L 29/06* | (2006.01) | |
| *H04L 29/08* | (2006.01) | |
| *H04L 29/12* | (2006.01) | |
| *H04W 28/16* | (2009.01) | |

(52) U.S. Cl.
CPC ........ *H04L 67/322* (2013.01); *H04L 61/1511* (2013.01); *H04L 63/1458* (2013.01); *H04W 28/16* (2013.01); *H04L 29/06027* (2013.01)

(58) Field of Classification Search
CPC ............... H04L 67/322; H04L 26/0896; H04L 26/06026; H04W 28/16
See application file for complete search history.

(56) References Cited

U.S. PATENT DOCUMENTS

| | | | |
|---|---|---|---|
| 8,429,742 B2 | 4/2013 | Stockdell | |
| 8,595,477 B1 | 11/2013 | Jain | |
| 8,745,723 B2 | 6/2014 | Garrard et al. | |
| 8,796,265 B2 | 8/2014 | Moreau | |
| 2006/0107324 A1* | 5/2006 | Chirra | H04L 63/1458 726/23 |
| 2007/0195700 A1* | 8/2007 | Katoh | H04L 41/147 370/235 |
| 2013/0198803 A1* | 8/2013 | Osterweil | H04L 61/1511 726/1 |
| 2015/0326589 A1* | 11/2015 | Smith | H04L 63/02 726/1 |

FOREIGN PATENT DOCUMENTS

| | | |
|---|---|---|
| CA | 2565409 | 8/2011 |
| WO | WO2008060009 | 5/2008 |

* cited by examiner

*Primary Examiner* — Dao Q Ho

(74) *Attorney, Agent, or Firm* — Thomas P. O'Connell; O'Connell Law Firm

(57) ABSTRACT

Quality-of-service management for Domain Name Service comprising identifying top-talking recursive resolvers of Domain Name Service packets, determining a baseline volume of Internet traffic, extrapolating future projected normal traffic volume, and allocating electronic communication network resources proportionally in accordance with the projected volume. Top-talking recursive resolvers not using a desired protocol can be induced to use that protocol, and a persistent session can be established with the top-talking recursive resolvers, such as by use of a TC flag set. The stateful nature of a TCP conversation allows rate-limiting and traffic volume management. A source IP address can be identified as apparently comprising a forged source IP address based on whether the desired transmission protocol is employed, and packets with the forged source IP address can be discarded.

12 Claims, 2 Drawing Sheets

QUALITY-OF-SERVICE MANAGEMENT FOR DOMAIN NAME SERVICE

FIELD OF THE INVENTION

The present invention relates generally to domain name service traffic flow. More particularly, disclosed and protected herein are a system and method for protecting domain name service traffic against performance degradation due to denial of service attacks, for limiting the overall impact of denial of service attacks against domain name services, and for partitioning the effect of attacks such that they do not deny service to networks uninvolved in the propagation of the attack traffic.

BACKGROUND OF THE INVENTION

Domain Name Service (DNS) is used to translate human-readable names of machines and more commonly services on the Internet into machine-readable numeric addresses to facilitate the routing of Internet traffic. An electronic DNS packet is a block of electronic bits typically including a source address, a destination address, a protocol identifier (Transmission Control Protocol (TCP) or User Datagram Protocol (UDP)), a port number (typically 53), and a data payload normally consisting of a query or a response. When DNS service slows or fails, Internet traffic is similarly hampered. Maintaining DNS service that is resilient against attack and that prioritizes responses to known-good partners is a prerequisite to maintaining high availability of Internet service generally.

There are, however, bad actors, such as computer hackers, cyber-criminals, and even national governments, that seek to attack the Domain Name System using what are referred to as Denial of Service (DoS) attacks. In a DoS attack, the attacker attempts to bombard a victim network or server with a large volume of traffic. The traffic overload consumes the victim's available bandwidth, CPU capacity, or other critical or constrained resources. These DoS attacks attempt to deny legitimate users access to the DNS service, thereby preventing their computers from resolving names, such as of web sites or email addresses, to Internet protocol addresses. Ultimately, the bad actors seek to prevent users from achieving their desired goal and to prevent the DNS from properly and effectively rendering its essential service. When successful, these attacks make Internet access slow, unreliable, or entirely unavailable thereby leading to inconvenience, lost productivity, and real economic losses.

SUMMARY OF THE INVENTION

With an awareness of the foregoing, the present inventor set forth with the fundamental object of applying quality-of-service management to Domain Name Service operative to protect the Domain Name Service traffic against performance degradation due to Denial-of-Service attacks.

A related object of embodiments of the invention is to provide quality-of-service management for Domain Name Service that limits the overall impact of Denial-of-Service attacks on the Domain Name Service.

Another object of the invention in particular embodiments is to partition the provision of the Domain Name Service in such a way that, while constrained by Denial of Service Attack, DNS services are delivered to intended recipients in inverse proportion with the degree to which their networks participated in propagating the attack traffic toward the DNS server, with the purpose and effect of shifting costs and effects away from the victims and back toward the attacker. Stated alternatively, management and mitigation cost burdens are sought to be reduced for DNS operators while those costs are shifted back to the specific Internet Service Providers that allow the attack to propagate through their networks.

An underlying object of the invention is to prevent or limit the inconvenience, lost productivity, and economic loss deriving from Denial-of-Service attacks on Domain Name Service.

A further object of the invention in embodiments thereof is to provide quality-of-service management for Domain Name Service that limits the rejection of good Internet traffic and minimizes the acceptance of bad Internet traffic.

These and further objects and advantages of the present invention will become obvious not only to one who reviews the present specification and drawings but also to those who have an opportunity to experience an embodiment of the quality-of-service management for Domain Name Service disclosed herein in operation. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more of the foregoing objects of the invention, an embodiment of the invention comprises a quality-of-service management method for Domain Name Service with the transmission of electronic packets over an electronic communication network implemented by electronic computer. The method can include, in certain manifestations, identifying recursive resolvers of electronic packets that are top-talking recursive resolvers, determining a baseline volume of Internet traffic for at least one of the top-talking recursive resolvers, extrapolating a future projected normal traffic volume for the at least one of the top-talking recursive resolvers, and allocating electronic communication network resources in accordance with the projected normal traffic volume. The step of extrapolating a future normal traffic volume can accommodate for projected growth and jitter.

Practices of the quality-of-service management method for Domain Name Service can further include determining, based on traffic volume in excess of the future projected normal traffic volume, a source IP address as apparently comprising a forged source IP address. Packets with the apparently forged source IP address can then be discarded at reduced risk of impeding traffic from legitimate source IP addresses.

The quality-of-service management method for Domain Name Service can additionally include the step of inducing top-talking recursive resolvers not using a desired electronic transmission protocol to use the desired electronic transmission protocol. Moreover, it is contemplated that the quality-of-service management method can include establishing a persistent electronic transmission protocol session with the top-talking recursive resolvers under the desired electronic transmission protocol.

By way of example, the step of inducing top-talking recursive resolvers not using the desired electronic transmission protocol to use the desired electronic transmission protocol can take the form of responding to a Domain Name Service query with a User Datagram Protocol (UDP) packet with a packet with a Domain Name Service TC flag set. This can establish a Transmission Control Protocol (TCP) electronic transmission protocol session. A persistent electronic transmission protocol session with the top-talking recursive resolvers under the Transmission Control Protocol (TCP) electronic transmission protocol can be established, such as by not closing the electronic transmission protocol session after a Domain Name Service response is transmitted under the Transmission Control Protocol (TCP) electronic transmission protocol.

Based on whether a packet uses the desired electronic transmission protocol, a source IP address can be determined as apparently comprising a forged source IP address, and packets with the forged source IP address can be discarded. In particular, the steps of determining a source IP address as apparently comprising a forged source IP address and discarding packets with the forged source IP address can include discarding packets entering the electronic communication network with source addresses purporting to be from a top-talking recursive resolver but not according to the desired electronic transmission protocol.

It is further within the scope of the invention for the baseline volume of Internet traffic of the at least one of the top-talking recursive resolvers to be iteratively updated to produce an updated baseline volume. Network resources can be re-allocated in accordance with the updated baseline volume.

The step of identifying recursive resolvers that are top-talking recursive resolvers can be carried out, for instance, by electronically observing Internet traffic received during a period in which a Denial-of-Service attack is not occurring. During that period, a plurality of most significant sources of Internet traffic can be identified.

In another embodiment of the invention, quality-of-service management for Domain Name Service can include identifying recursive resolvers of electronic packets that are top-talking recursive resolvers, inducing top-talking recursive resolvers not using a desired electronic transmission protocol to use the desired electronic transmission protocol, establishing a persistent electronic transmission protocol session with the top-talking recursive resolvers under the desired electronic transmission protocol, determining, based on whether a packet uses the desired electronic transmission protocol, a source IP address as apparently comprising a forged source IP address, and discarding packets with the forged source IP address.

One will appreciate that the foregoing discussion broadly outlines the more important goals and certain features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

Figure 1:
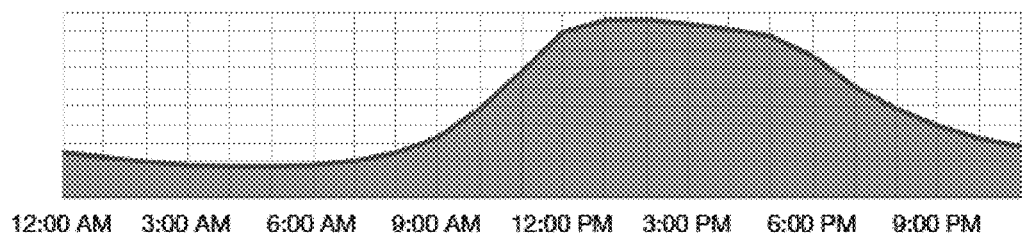
FIG. 1 is a chart depicting a typical Internet traffic profile over time.

Quality-of-service management for Domain Name Service as disclosed herein can pursue a wide variety of embodiments, each within the scope of the invention. However, to ensure that one skilled in the art will be able to understand and, in appropriate cases, practice the present invention, certain preferred embodiments and aspects of the broader invention revealed herein are described below and shown in the accompanying drawing figures.

Embodiments of the quality-of-service management for Domain Name Service disclosed herein can be operative on an electronic data network to combine a quality-of-service method wherein low priority messages can be discarded in accordance with an evaluation or benchmarking method wherein an Internet traffic baseline is produced. Optionally, a signaled change can be induced to the flow of DNS traffic between corresponding servers. In a further option, a rate-limiting or flow-control methodology can be applied to Transmission Control Protocol (TCP) packets containing DNS messages. Optionally, cryptographic signatures or privacy may be applied to the flow of DNS traffic between corresponding servers. The quality-of-service management system and method can be automated through one or more computer-readable electronic storage devices with a program or programs of instructions stored on the computer-readable storage device or devices that, when executed by an electronic computer or on electronic computers, cause the computer or computers to perform some or all of the operations and steps shown and described herein.

Through the disclosed quality-of-service management system and method, the Domain Name Service can align the incentives of recursive resolver operators to limit DoS traffic passing through their otherwise-legitimate servers, protect DNS traffic against performance degradation due to traffic from other sources, and limit the overall impact of DoS attacks against the DNS. It is important to note that the same basic technique can be applied to both recursive DNS resolvers, which transmit queries, and authoritative DNS servers, which provide answers. Because great value is achieved when the technique is applied on authoritative servers, the terminology associated with authoritative servers may for convenience be used herein with the assumption that the direction of application is on the authoritative server side, facing recursive resolvers. It will be understood, however, that the quality-of-service management system and method disclosed herein is not so limited.

The quality-of-service management for Domain Name Service disclosed herein can be characterized as a plurality of steps or modules, some or all of which potentially being automated through one or more computer-readable electronic storage devices with a program or programs of instructions stored on the computer-readable storage device or devices and executed by an electronic computer or electronic computers to cause the computer or computers to perform some or all of the operations and steps shown and described herein. It will be understood that, although some steps may advantageously be done in immediate or non-immediate succession, no such requirement or necessity shall be interpreted or applied except as it might be expressly set forth in the claims.

In one step or module, the quality-of-service management system and method can identify recursive resolvers that could be characterized as top talkers. For example, the electronic system can observe normal DNS traffic, such as traffic received from recursive resolvers over an electronic data network. A "top talkers" analysis can then be performed. A normal, or non-DoS attack, distribution of Internet traffic can be observed over a span of time, such as by source IP address of each recursive resolver. The most significant sources of traffic can be ascertained. The sum of the traffic of the most significant sources can, for example, be the majority of total traffic or a given percentage or other portion of total traffic.

In a further step, top-talking recursive resolvers can be forced over to a desired transmission protocol, such as a Transmission Control Protocol (TCP). To accomplish this, each time a DNS query is received within an User Datagram Protocol (UDP) packet with a source address corresponding to one of the top-talking recursive resolvers, the electronic Domain Name Service system can respond with a packet with the DNS TC flag set. The DNS TC flag signals to the top-talking recursive resolver—if it was indeed the authentic originator of the UDP DNS query—that it should retry its query using the Transmission Control Protocol (TCP) rather than the UDP. While UDP may be considered "stateless" with each packet arriving with no additional context, TCP queries consist of a bidirectional conversation that is very difficult to spoof. With that, TCP provides added context necessary to distinguish legitimate traffic from illegitimate traffic.

With top-talking recursive resolvers using Transmission Control Protocol, including those forced to use TCP, persistent TCP sessions can be established. This can be accomplished, for example, by not closing the TCP session once a DNS response is transmitted within a TCP session corresponding to one of the top-talking recursive resolvers. By leaving the session open, the recursive resolver is signaled that it should continue to use the session for future queries.

As suggested in FIG. 1, the volume of query traffic can be expected to vary along a somewhat regular and predictable distribution over the course of a given time period in which the system is not subject to DoS attack. For each top-talking recursive resolver, therefore, there can be expected to be diurnal variation in traffic volume. There will also likely be variations between days, such as between weekends and weekdays, holidays and working days, and potentially other discernible variations over predetermined time periods.

Consequently, a baseline can be established by determining a time window of normal traffic volume for each of the top-talking recursive resolvers. For each top-talking recursive resolver, the disclosed system and method can thus establish a typical traffic profile, or "baseline," potentially by mapping time of day and day of week, to produce a chart of expected maximum query volume as shown in FIG. 1. Moreover, for the single set containing all remaining traffic originating from sources other than the top-talking recursive resolvers, a similar typical traffic profile over time can be separately determined.

Figure 2:
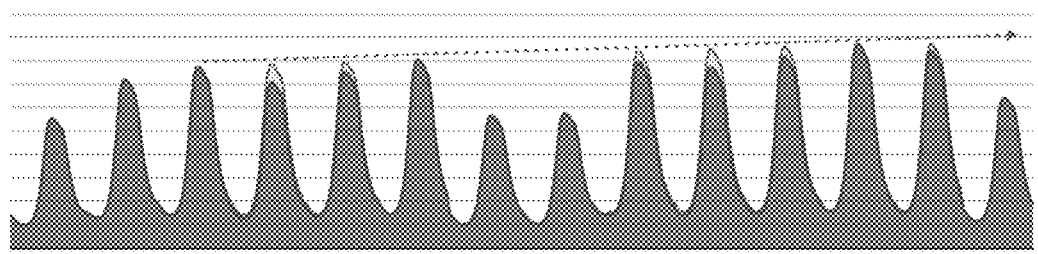
FIG. 2 is a chart of projected Internet traffic volumes for a recursive resolver with a window for normal traffic volume jitter.

It is additionally possible to engage in a further step of extrapolating and predicting future normal traffic volumes. For example, for each top-talking recursive resolver, the system and method could compare normal traffic volumes observed over a given time period, such as week-over-week, over a longer period of time to determine an expected change-over-time in the maximum expected query volume, which can be referred to as growth, and normal variation in those values, which can be referred to as jitter. As in the example of FIG. 2, one could then project normal growth into the future, and the projected traffic volumes could be surrounded with a window that accommodates normal jitter. This could then produce an irregular waveform as seen, for example, in FIG. 2 that minimally encloses all expected future normal traffic at any specific future point in time. Similarly, for the single set containing all remaining traffic originating from sources other than the top-talking recursive resolvers, the system and method could establish an irregular waveform that minimally encloses all expected future normal traffic at any specific future point in time.

Figure 3:
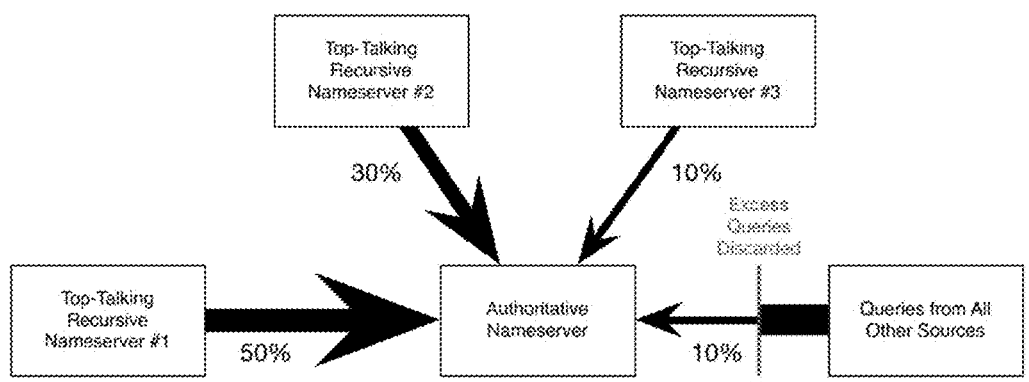
FIG. 3 is a schematic depiction of an allocated traffic distribution in a Domain Name Service.

With projected normal traffic volumes established, the quality-of service management system and method can then allocate network resources in accordance with that projected normal traffic volume. An illustrative example from among the many possible examples of such an allocated traffic distribution in a Domain Name Service is schematically depicted in FIG. 3. As shown, a network resource allocation scheme can be created wherein each top-talking recursive resolver is allocated a share of the total available network resources proportional to its expected normal use at any specific point in time and, similarly, all remaining traffic originating from other sources is allocated a collective share proportional to its expected use. It will be understood that the permutations are numerous and that the example of FIG. 3 merely provides one illustrative possibility.

The quality-of-service management system and method, again operative through computer-readable electronic storage devices with a program or programs of instructions stored on the computer-readable storage device or devices and executed by an electronic computer or on electronic computers, can include the further step of discarding packets which can be discerned to be labeled with forged source IP addresses, based upon their having arrived in the network through a point of entry not normally associated with that source IP address, or by which reply traffic to that source IP address would not normally flow, by the lack of any routing information by which reply traffic could be directed, or by other means. The foregoing methods can thus make discard determinations for packets in pattern-based, Unicast Reverse Path Forwarding (URPF) strict mode, or URPF loose modes to limit malicious traffic on the network. In Unicast RPF strict mode, the packet must be received on the interface that the router would use to forward the return packet. In strict mode, each incoming packet is tested against the forwarding information base (FIB) and if the incoming interface is not the best reverse path the packet check will fail. By default, failed packets will be discarded. When Unicast RPF is configured in strict mode, legitimate traffic may nonetheless be dropped where it is received on an interface that was not the router's choice for sending return traffic. Dropping this legitimate traffic could occur when asymmetric routing paths are present in the network. In Unicast RPF operative in loose mode, the source address must appear in the routing table. In loose mode, each incoming packet's source address is tested against the FIB. The packet is dropped only if the source address is not reachable via any interface on that router.

In this regard, it will be recognized that the discrimination of forged source IP addresses on UDP packets is normally a difficult problem. However, once persistent TCP flows have been established with top-talking recursive resolvers, packets entering the electronic communication network with source addresses purporting to be from those top-talking servers, but entering through network interfaces other than those carrying the successful TCP flows, may be discarded, such as by using uRPF Strict Mode, with insignificant danger of affecting legitimate traffic. Likewise, packets entering the network with source addresses purporting to be from those top-talking servers, but using UDP rather than TCP, may be discarded relatively safely if they become too voluminous to reasonably answer with TC-flagged responses.

The system can be operative with a step of signaling network resource allocation to top-talking recursive resolvers, such as by using TCP flow management. The system and method could, for example, use TCP Flow Control, Congestion Avoidance, Explicit Congestion Notification, or any of the many other well-known techniques or combinations thereof for rate-limiting incoming TCP flows to signal each top-talking recursive resolver the availability or non-availability of additional network resources within its allocation. In the event that a top-talking recursive resolver exceeds its network resource allocation, incoming queries from that source could be discarded as necessary, with or without notification to the sender, to preserve the network resources allocated to each of the other top-talking recursive resolvers and the final allocation to all remaining traffic originating from other sources. This example could, for example, use an implementation of the rudimentary Quality of Service (QoS) algorithm known as Paris Metro Pricing, developed by Andrew Odlyzko, then of AT&T Labs. Other QoS algorithms may be applied additionally or alternatively.

Manifestations of the system and method also iteratively update baselines or other allocations whether established as described hereinabove or otherwise. In one practice of the system, this could be carried out by continuing to track average utilization by each identified top-talker and continuing to perform top-talker analysis of the collective, other category. With this, the respective baselines can be kept accurate. Moreover, the system and method can be operative to update the top-talkers list as necessary, such as by promoting newly-active recursive resolvers, potentially from the collective-other category, to receive individual attention and allocation, and, potentially, demoting currently-identified top-talkers to the collective, other category if they stop sending as many queries and fall out of the top-talker category.

Using some or all of the steps disclosed herein, again not necessarily in the order described, the quality-of-service management for Domain Name Service disclosed herein is able allocate a known-reasonable portion of total available capacity to each top-talking recursive resolver and, similarly, a known-reasonable portion of the total available capacity to all remaining traffic originating from other sources. These allocations can then be defended from incursion by excess traffic in other source IP address categories. Among other things, this aligns incentives such that no correspondent of a Domain Name Service is punished when one of the others transmits a larger-than-deemed reasonable, allocated volume of traffic. Where a given correspondent has excessive traffic, it receives reduced performance correlated with the increased transmission. More specifically, if one Internet Service Provider or recursive DNS resolver operator is transmitting Denial of Service (DoS or DDoS) traffic towards a Domain Name Service, the others are protected from it, and only that ISP's other customers are affected. Not only is this an equitable distribution, but it also further incentivizes that ISP or recursive resolver operator to resolve its security problem. Likewise, if DoS traffic is received from other sources, it falls into the final category for all remaining traffic and does not impinge upon the performance the Domain Name Service offers to the majority of correspondents, which are represented by known top-talkers.

The system and method for quality-of-service management for Domain Name Service Methodology described above could be implemented in what is referred to as a middle box wherein the electronic system and method is disposed to a given side electronically while traditional Domain Name Service communications are disposed on the other side electronically. It would also be possible for the system and method to be partially or entirely implemented and integrated within a Domain Name Service server or within an electronic firewall. Still further, the system and method could be implemented and integrated partially or completely into one or more of a router, a proxy, or a load balancer. Still other implementations are possible and within the scope of the invention except as it might be expressly limited by the claims.

It will be recognized that the QoS method disclosed herein wherein low priority messages are discarded in accordance with an evaluation or benchmarking method based on an Internet traffic baseline is applied in what may be considered a fairly coarse manner and, as such, may be best applied where finer methods are insufficiently effective. Indeed, with richer information or additional context regarding DNS traffic flows available, other methods for distinguishing legitimate traffic from illegitimate traffic may be used preliminarily or in conjunction with the methods disclosed herein.

For instance, if the system has a positive identification criterion indicating the DNS query is legitimate or a negative identification criterion indicating that the DNS query is illegitimate, the query can be accepted or rejected as appropriate. Such positive identification criteria can be processed first to yield a faster result for legitimate traffic, or the negative criteria could be processed first thereby to permit illegitimate traffic to be discarded more quickly. The former option may be employed under normal circumstances with the latter option being exploited as necessitated by the circumstances, such as in the event of a dire attack on the service.

With certain details and embodiments of the present invention for quality-of-service management for Domain Name Service disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, any such claims shall be construed to cover not only the corresponding structure and material expressly described in this specification but also all equivalents thereof.

I claim as deserving the protection of Letters Patent:

1. A quality-of-service management method for Domain Name Service with the transmission of electronic Domain Name Service packets over an electronic communication network with available network resources implemented by electronic computer comprising the following steps:
   identifying recursive resolvers of electronic Domain Name Service packets that are top-talking recursive resolvers;
   for at least one of the top-talking recursive resolvers:
      determining a baseline volume of Internet traffic,
      extrapolating a future projected normal traffic volume,
      and allocating electronic communication network resources of available network resources proportionally in accordance with the future projected normal traffic volume;

for remaining traffic originating from sources other than the at least one of the top-talking recursive resolvers: establishing a waveform that encloses expected future normal traffic and allocating a collective share of available network resources proportional to expected future normal traffic;

inducing top-talking recursive resolvers not using a desired electronic transmission protocol to use the desired electronic transmission protocol comprising responding to a Domain Name Service query with a User Datagram Protocol (UDP) Domain Name Service packet with a Domain Name Service packet with a TC flag set to establish a Transmission Control Protocol (TCP) electronic transmission protocol session; and establishing a persistent electronic transmission protocol session with the top-talking recursive resolvers under the Transmission Control Protocol (TCP) electronic transmission protocol.

2. The quality-of-service management method for Domain Name Service of claim 1 wherein the step of extrapolating a future projected normal traffic volume includes projected growth and jitter.

3. The quality-of-service management method for Domain Name Service of claim 1 further comprising the steps of determining, based on traffic volume in excess of the future projected normal traffic volume, a source IP address as apparently comprising a forged source IP address and discarding Domain Name Service packets with the forged source IP address.

4. The quality-of-service management method for domain name service of claim 1 wherein the step of establishing a persistent electronic transmission protocol session with the top-talking recursive resolvers under the Transmission Control Protocol (TCP) electronic transmission protocol comprises not closing the electronic transmission protocol session after a Domain Name Service response is transmitted under the Transmission Control Protocol (TCP) electronic transmission protocol.

5. The quality-of-service management method for Domain Name Service of claim 1 further comprising the steps of determining, based on whether a Domain Name Service packet uses the desired electronic transmission protocol, a source IP address as apparently comprising a forged source IP address and discarding Domain Name Service packets with the forged source IP address.

6. The quality-of-service management method for Domain Name Service of claim 5 wherein the steps of determining a source IP address as apparently comprising a forged source IP address and discarding Domain Name Service packets with the forged source IP address includes discarding Domain Name Service packets entering the electronic communication network with source addresses purporting to be from a top-talking recursive resolver but not according to the desired electronic transmission protocol.

7. The quality-of-service management method for Domain Name Service of claim 1 further comprising the step of iteratively updating the baseline volume of Internet traffic for the at least one of the top-talking recursive resolvers to produce an updated baseline volume and proportionally re-allocating network resources to the at least one of the top-talking recursive resolvers and to the sources other than the at least one of the top-talking recursive resolvers in accordance with the updated baseline volume.

8. The quality-of-service management method for Domain Name Service of claim 1 wherein the step of identifying recursive resolvers that are top-talking recursive resolvers comprises electronically observing Internet traffic received during a period in which a Denial-of-Service attack is not occurring and identifying a plurality of most significant sources of Internet traffic during that period.

9. A quality-of-service management method for Domain Name Service with the transmission of electronic Domain Name Service packets over an electronic communication network with available network resources implemented by electronic computer comprising the following steps:

identifying recursive resolvers of electronic Domain Name Service packets that are top-talking recursive resolvers;

determining a baseline volume of Internet traffic for the top-talking recursive resolvers;

for at least one of the top-talking recursive resolvers, determining a baseline volume of Internet traffic, extrapolating a future projected normal traffic volume, and allocating electronic communication network resources of available network resources proportionally in accordance with the future projected normal traffic volume;

for remaining traffic originating from sources other than the at least one of the top-talking recursive resolvers, establishing a waveform that encloses expected future normal traffic, and allocating a collective share of available network resources proportional to expected future normal traffic;

inducing top-talking recursive resolvers not using a desired electronic transmission protocol to use the desired electronic transmission protocol comprising responding to a Domain Name Service query with a User Datagram Protocol (UDP) Domain Name Service packet with a Domain Name Service packet with a TC flag set to establish a Transmission Control Protocol (TCP) electronic transmission protocol session;

establishing a persistent electronic transmission protocol session with the top-talking recursive resolvers under the desired electronic transmission protocol wherein the step of establishing a persistent electronic transmission protocol session with the top-talking recursive resolvers comprises not closing the electronic transmission protocol session after a Domain Name Service response is transmitted under the Transmission Control Protocol (TCP) electronic transmission protocol;

determining, based on whether a Domain Name Service packet uses the desired electronic transmission protocol, a source IP address as apparently comprising a forged source IP address; and discarding Domain Name Service packets with the forged source IP address.

10. The quality-of-service management method for Domain Name Service of claim 9 wherein the steps of determining a source IP address as apparently comprising a forged source IP address and discarding Domain Name Service packets with the forged source IP address includes discarding Domain Name Service packets entering the electronic communication network with source addresses purporting to be from a top-talking recursive resolver but not according to the desired electronic transmission protocol.

11. The quality-of-service management method for Domain Name Service of claim 9 further comprising the step of iteratively updating the baseline volume of Internet traffic for the top-talking recursive resolvers to produce an updated baseline volume and proportionally re-allocating network resources to the top-talking recursive resolvers and to the sources other than the top-talking recursive resolvers in accordance with the updated baseline volume.

12. The quality-of-service management method for Domain Name Service of claim 9 wherein the step of identifying recursive resolvers that are top-talking recursive resolvers comprises electronically observing Internet traffic received during a period in which a Denial-of-Service attack is not occurring and identifying a plurality of most significant sources of Internet traffic during that period.

\* \* \* \* \*